United States Patent

[11] 3,587,936

[72] Inventor Dominic J. Riotto
Barnesville, Pa.
[21] Appl. No. 814,215
[22] Filed Jan. 21, 1969
[45] Patented June 28, 1971
[73] Assignee Commercial Solvents Corporation
Terre Haute, Ind.
Continuation-in-part of application Ser. No. 604,888, Dec. 27, 1966, now abandoned.

[54] MOVABLE WALL SEPARATORS FOR PARTICULATE MATERIAL STORAGE TO PREVENT BRIDGED MATERIAL BLOCKAGES
13 Claims, 3 Drawing Figs.
[52] U.S. Cl. .................................................... 222/196
[51] Int. Cl. ..................................................... B65g 3/12
[50] Field of Search.......................................... 222/195, 196, 564, 202, 203, 462, (Inquired); 193/32

[56] References Cited
UNITED STATES PATENTS
| | | | |
|---|---|---|---|
| 2,025,702 | 12/1935 | Anderson..................... | 193/32 |
| 3,337,094 | 8/1967 | Houston....................... | 222/196 |
| 3,366,283 | 1/1968 | Newcomb..................... | 222/462X |

*Primary Examiner*—Stanley H. Tollberg
*Attorney*—Janes & Chapman

ABSTRACT: Movable separators are vertically suspended within a particulate material container to form a plurality of vertical zones or compartments, each compartment having at least one movable wall in common with an adjacent compartment. If, upon removal of the particulate material from the container, the material in one or more compartments has become tightly packed, the flow of material from an adjacent compartment will create a space into which the separator dividing the two compartments will move. This effectively collapses any bridge by dislocating one of its anchor points, and thereby facilitates free flow from the container.

PATENTED JUN28 1971 3,587,936

MOVABLE WALL SEPARATORS FOR PARTICULATE MATERIAL STORAGE TO PREVENT BRIDGED MATERIAL BLOCKAGES

This application is a continuation-in-part of copending U.S. application Ser. No. 604,888, filed Dec. 27, 1966, and abandoned.

This invention relates to a movable separator wall for preventing bridging of particulate material in storage, and more particularly, to hanging wall separators which movably divide particulate material storage containers into two or more vertical zones or sections so that any imbalance of material flow from any zone or section due to bridging results eventually in swinging of a wall separator of that compartment, under pressure of the bridged material, thereby dislodging such material.

It is well known that many kinds of granular, flaked, prilled and powdered particulate materials when stored in bulk tend to form or settle into masses which form bridges or arches between walls of the storage receptacle. These bridges frequently will not of their own volition break apart and flow freely, but instead block gravity flow of any material above the bridge. When such a material is stored in large containers, such as silos, its removal from the lower portion by means of gravity feed or mechanical conveyors can therefore be quite troublesome. This is particularly true where the material has been stored for extended periods of time, which allow it to settle within the container and form tight masses or agglomerates. Often, only a small portion of the stored material will flow from the bottom of the container, before flow ceases, due to bridging of more tightly packed material in the lower portion of the container. Although relatively loose material can flow out from beneath the bridge, material above the bridge is held up. If the blockage is severe, it may even be necessary for a man to enter the receptacle to break the material apart by smashing the bridges to induce the material to flow freely.

Various devices have been proposed to break up such blockages. These include vibrating the stored material and/or its container, and blowing air or gas through the material while in the container. These devices are costly to install and to operate, and experience has shown that they are not always effective.

Devices have also been provided to prevent the formation of bridges, and thus ensure the free flow of packed material from within a storage container. One such device is shown in U.S. Pat. No. 3,366,283 to Newcomb. It is Newcomb's theory that bridging occurs between walls of the receptacle, and is prevented when the walls are at varying angles, so that walls of the container are nonsymmetrical. Therefore, Newcomb uses a rigid L-shaped beam, called a control element, which he indicates simulates a hopper having two upright walls and two sloping walls converging on a throat. The beam is suspended axially within the container above the discharge opening. According to Newcomb, the flow of material from the discharge opening exerts an upward force upon the control element which moves it angularly with respect to the vertical axis of the container. The angular movement of the control element creates the effect of a nonsymmetrical container at the center, thereby preventing the bridging of material.

The difficulty with the Newcomb device is that bridges can and do form between asymmetrical walls, and if a bridge does form therein, there is no way for the L-beam to move, so as to dislodge it. If, for example, particulate material is tightly packed between the beam 15 and the wall 10a of the container, as shown in FIG. 5, flow below the blockage cannot release the L-beam. Movement of the control element towards wall 10a, the only movement possible, is prevented by the bridge. Therefore, when particulate material has been tightly compressed within the container, the control element is held in its position and can do nothing to effectuate the free flow of material.

U.S. Pat. No. 3,337,094 to Houston discloses a series of inflatable tubes hung within a storage container. The tubes are imbedded in and surrounded by the particulate material. If bridging occurs, the tubes are inflated. The idea is that the tube inflates below the bridge, and thus breaks off the material of the bridge where it is forced outwardly by the change in dimensions of the tube. This, in conjunction with the weakening effect of the tube itself, is said to be "normally sufficient to break down the bridge." However, the difficulty is that the expansion of the tube below the bridge has exactly the opposite effect: it tends to compress the material forming the bridge, and push it upwardly, thus strengthening it. The inflation of a tube imbedded in the bridge also tends to compress the material. The tubes may be effective with grain, which has little or no tendency to stick together, but they are wholly ineffective with any material which when compressed agglomerates, and this agglomerating effect is accentuated because the tubes are relatively small in size. A further disadvantage is that the tubes require inflation, and this requires a compressor, which is expensive both to install and to operate.

In accordance with the present invention, a movable wall separator for particulate material storage containers is provided, to effectively prevent bridging of material within the container, and thereby facilitate the free flow of particulate material. The separators of the present invention are effective with particles of any size, and even with particles which become agglomerated under pressure, because they move to relieve pressure against them, such as by a bridge of material, and thereby automatically loosen the material, and let the bridge fall. Thus, the separators of the invention are particularly effective with tightly packed material.

The particulate material storage containers of this invention which inhibit formation of bridges in material stored therein comprise, in combination, a container having sidewalls and at least one discharge opening in a lower portion thereof, and at least one movable wall separator vertically suspended from an upper portion within the container to define with the sidewalls a plurality of vertical zones, all of which feed material therein to a discharge opening, the separator being responsive to any nonuniform withdrawal of material from any zone on one side of the separator, resulting in a larger proportion of open space in that zone, to move into that open space, and thereby release any material held up in the adjacent zone on the other side of the separator. In this way, movement of the separator breaks up or prevents bridges, and effectuates the free flow of particulate material, by dislocating one of the base walls upon which a bridge is built, and by dislodging the packed material.

The theory of the invention is that if at least one wall against which a bridge is supported is movable into an empty space from which material has been removed, the bridge can be dislodged every time it is formed. By separating the interior of the container into a plurality of vertical zones or compartments, each having at least one movable wall in common with an adjacent compartment, and feeding all zones or compartments to a discharge opening, due to the fact that bridges are most unlikely to form in each zone or compartment at the same vertical level, one is assured of being able to withdraw material from at least one zone or compartment. Therefore, a loss of material from any given compartment provides the open space into which a separator wall can move, and thus unbalances the system, causing any material held up in an adjacent zone to force the movable separator wall of the zone or compartment to move into that space, thereby dislocating the anchor or base portion of the bridge, and loosening any mass of particulate material.

The separators are supported vertically within the container by an overhead suspension system. The suspension system is designed to allow the separator to move laterally, such as to rotate about an axis, or to swing freely about its upper edge. In a preferred embodiment, the suspension system comprises a horizontal support arm which rests upon or is secured to the upper edge of the container sidewalls, and has a plurality of cables or chains vertically suspended therefrom. These chains or cables are attached to the uppermost portion of the separators, to position them within the container, yet allow free swinging movement.

It is important that each separator be capable of lateral or angular movement at any position along its height or width. This allows the separator to move in response to any localized material flow imbalance at any vertical position along the separator, between compartments or zones. In this manner, if the upper portion of the container is packed tightly, so that the separator is incapable of swinging movement, the lower portion of the separator can move laterally, thereby freeing the packed material. To accomplish this mode of movement for the separator, it is preferred that it be constructed from flexible material. It can, however, be formed from one or a plurality of joined rigid sheets or plates, all hinged together horizontally to allow swinging movement of the lower plates about their hinged attachments to the upper plates.

In a preferred embodiment of this invention, three flexible wall separators of equal size are suspended in a radial or fan arrangement from a common central axis within a cylindrical container from an overhead suspension system. The separators are spaced 120° apart, thus forming three segmental compartments within the container. The separators do not meet at the central axis, nor do they extend to the sidewalls of the container. However, the spacing between the three separators at the center of the container and the spacing between the cylindrical wall of the container and the separators is kept to a minimum, to prevent bridging in these open areas.

The separators can be constructed from any suitable material which allows flexing of one portion. These materials include thin metallic sheets of aluminum or steel or any other suitable metallic material. The metallic material should have a thickness in the range of approximately one sixty-fourth inch to one-sixteenth inch. Nonmetallic materials including fabric, plastics, such as nylon, polyethylene, polypropylene, polyvinyl chloride, vinyl chloride-vinylidene chloride copolymers, polyamides and polytetrafluoroethylene, and rubber can also be efficiently utilized for the separators.

The separator walls can be inflatable. Such walls can be constructed of rubber, plastic, or rubber- or plastic-impregnated fabric. Suitable air inlets are located to allow their inflation from a compressed air source. In most cases, the geometry and flexibility of the separators are sufficient to prevent material hang-up, but when stubborn pockets are expected to occur, due to the particular material stored or the length of time of storage, the inflatable-type separator is preferred since its inflation will help dislodge the resisting material.

The separators of this invention can be suspended within any shape particulate material container, providing they are arranged so as to form a plurality of compartments. These containers include silos, bins and hoppers of all known shapes and sizes. This invention is also useful for preventing the bridging of particulate material during transportation from one location to another in such carriers as railroad hopper cars, freight cars and highway bulk material carriers.

When conventional loading and unloading methods for containers and carriers are used, the use of the separators does not hamper operations and in many cases, provides an asset by preventing the material from being adversely pulverized during the loading process.

The preferred embodiments of this invention are shown in the drawings in which.

Figure 1:
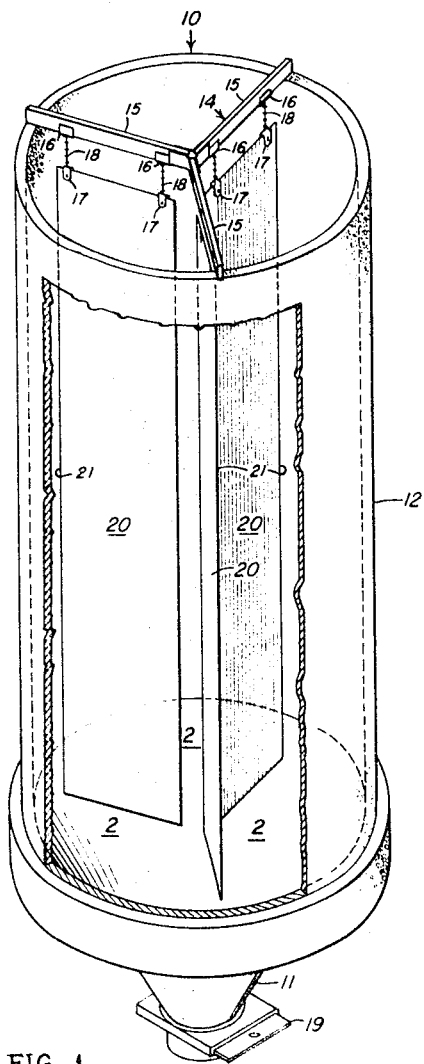
FIG. 1 is a perspective view of a cylindrical storage bin equipped with the separator device of this invention.

In FIG. 1, the separator device of this invention is disposed within a cylindrical granular ammonium nitrate storage bin 10 having a conical base portion 11 and a discharge hopper gate 19 for the discharge of particulate material stored within the bin. The separator device disposed within the bin 10 comprises three separator sheets 20, all of equal size, positioned radially within the bin 10 at an angle of approximately 120° from each other, so as to form three vertical storage compartments 2. The separators are formed from a flexible nylon fabric impregnated with neoprene and approximately one thirty-second inch thick. The separators 20 thereby form flexible walls between adjacent storage compartments 2. The separators 20 are hung in the bin 10 in their radial position by the overhead suspension system 14, and are not attached elsewhere, so that they are free to swing from side to side. The suspension system 14 comprises three radial arms 15, spaced 120° apart and secured to the top of the cylindrical sidewall 12 of the cylindrical bin 10 at their outermost portions. A pair of laterally movable clamps 16 are secured to each arm 15. Gripping holders 17 which are secured to the upper portion of each separator sheet 20 are suspended from the movable clamps 16 by means of cables or chains 18. Hanging the separator sheets 20 from one end in this manner permits their swinging movement within the bin 10. Each adjacent but not abutting separator sheet 20 extends radially from the open center of the bin to a position adjacent to but not touching the cylindrical sidewall 12. The spaces between each separator at the center and the spaces between the outer edge 21 of the separator 20 and the inside of wall 12 are sufficiently large to permit free swinging movement of the separators 20.

In use, the particulate material to be stored in the bin 10, in this case, granular ammonium nitrate, is fed in by any suitable means through the open top, and filled uniformly into the three compartments 2. Material is withdrawn at the bottom of the conical base portion 11, via hopper gate 19. The separators 20 prevent the formation of or break up any bridges which would otherwise tend to hold up the material and result in air spaces in the bin 10. Bridging occurs between walls of the bin, and one anchor of such a bridge must therefore be one of the separator walls 20. The bridge blocks further entry of material into that compartment, leaving an air space below the bridge, but not into the adjacent compartments. The result is lateral movement of the separator into the air space, and this movement breaks the bridge, and allows material to enter the air space, thus ensuring complete filling of the bin 10.

Similarly, the separators 20 prevent blockages due to the formation of bridges upon the removal of material from the bin 10 via the hopper slide gate 19, at the lower portion of the base 11. Blockages due to bridging are particularly a problem if the particulate material has been stored therein for extended periods of time, and is of a hygroscopic or slightly sticky nature, thereby becoming tightly packed. The separators 20 are designed to extend as close to the discharge area of the bin as is possible while still permitting their free movement. It is unlikely that blockages of material at the same vertical level will occur in all three compartments, so as to prevent any flow from the slide gate 19. Therefore, when the material is withdrawn, if material flows only from one or two compartments, and a blockage exists in the adjacent compartment, an empty space is formed below the blockage in the same compartment, and beside the blockage on the other side of the separator 20 in the adjacent compartment. The pressure of the material in the blocked compartment causes the separator to move into the open space, thereby freeing the blocked material by loosening it, and moving one of the anchors of the bridge. The bridge collapses in the open space beneath it, and in so doing, the aggregated material is broken up into particles again. This effectively prevents bridging, loosens enmassed material and ensures rapid removal of the stored particulate material.

Figure 2:
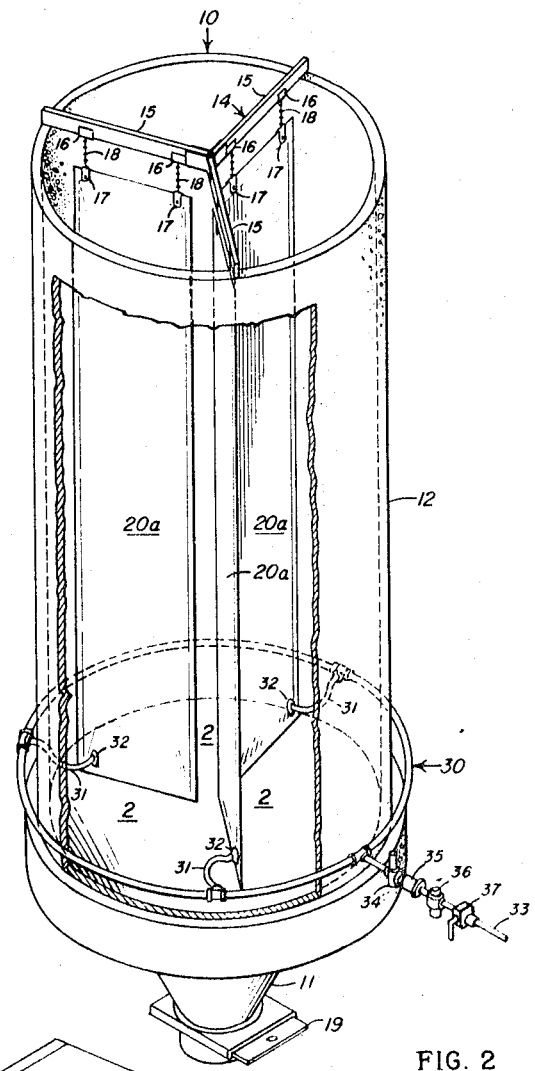
FIG. 2 is another perspective view of a cylindrical storage bin in which the separator device utilizes inflatable walls.

In FIG. 2, inflatable separators walls 20a are utilized to define the three compartments 2 of a cylindrical granular sodium nitrate storage bin 10. The inflatable separator walls 20a are formed from two sheets of nylon, coated with neoprene. The side seams of the inflatable separator walls are cemented together, thereby forming a flat inflatable wall normally occupying (when deflated) only slightly more space than the flexible separators of FIG. 1. The separator walls 20a are suspended from suspension system 14, as described in FIG. 1. They are inflated from a flexible air manifold 30 of rubber hose connected to each separator by a short flexible tube 31, which leads to an air inlet 32 formed of a standard-type nipple clamped to the lower outer edge of separator 20a. The air manifold is fed by an air supply line 33 and can be regulated automatically or manually. The air pressure to the separators 20a is controlled by a three-way hand valve 37, a pressure regulating valve 36 and an air filter 35. A pressure release valve 34 is also provided to prevent damage to the separators and the flexible manifold from overpressurization.

The inflatable separators 20a are useful with granular sodium nitrate as in this case and with particulate material of extremely fine particle size, which is stored for extended periods of time. It is well known that such material becomes tightly packed when stored in this manner. Therefore, the separators 20a can be inflated to dislodge stubborn pockets of packed material. It should be noted that once material begins to flow from any compartment, the separators move into any open spaces formed, in response to a material imbalance, and that inflation of the separators serves no function in such response, to prevent bridging.

Figure 3:
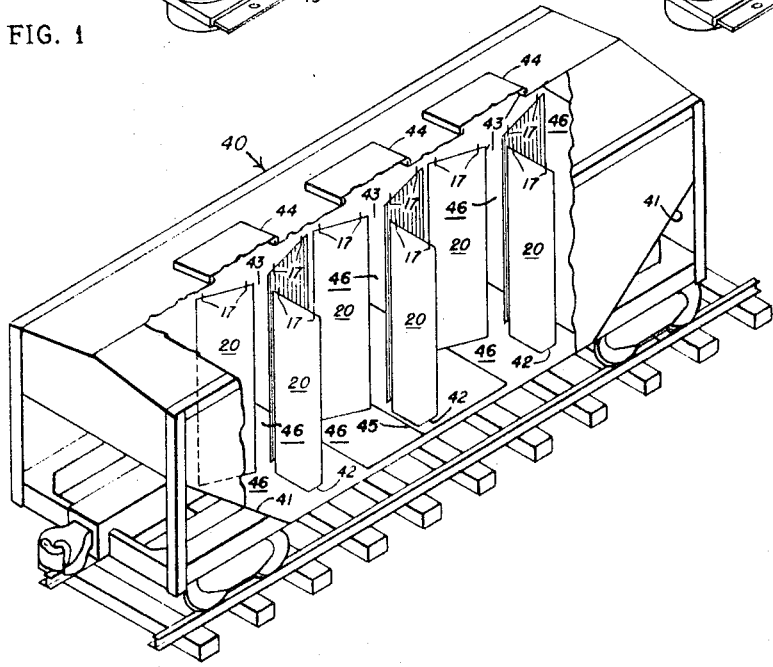
FIG. 3 is a perspective view of a railway car also equipped with the separator device of this invention.

A railroad freight car 40 for the transport of a cement material is shown in FIG. 3. The freight car 40 has three movable covers 44 that are removed in order to load the storage compartments in the car. A discharge hopper 45 is located in the center of the lower portion of the car 40, beneath the storage compartments. Disposed within the car, and hung radially in threes by a suspension system 43 similar to that of FIGS. 1 and 2, are nine separators 20. The separators are disposed within the car 40 above the hopper 45 in a manner so as to define a plurality of vertical storage compartments 46, the separators 20 constituting the walls of the vertical storage compartments. The lower portion 42 of each separator 20 is cut away at an angle to match the sloping sides 41 of the freight car 40. Each separator 20 extends to but does not touch the side and bottom walls of the car 40, so that the separators can swing freely on the suspension system 43.

In use, if upon removal of the cement material via the hopper 45 a blockage occurs, in any given compartment 46, the material will flow first from an adjacent compartment on the other side of the separator 20, creating an open space therein. Under the pressure of the blocked material, the separator 20 will move into this space, thus dislodging the blocked material, whereupon flow can proceed from the blocked compartment.

I claim:

1. A particulate material storage container which inhibits formation of blockages in the discharge of material stored therein, comprising, in combination, a container having sidewalls defining a storage space therewithin and at least one discharge opening in a lower portion thereof, at least one movable wall separator vertically suspended from an upper portion within the container and extending across a sufficient portion of the storage space to divide the storage space into a plurality of vertical compartments; each compartment having at least one movable wall in common with an adjacent compartment, and feeding material therein to a discharge opening, the movable wall separator being responsive to a greater withdrawal of material from a first compartment one side thereof than in a second compartment on the other side thereof resulting in a larger proportion of open space in the first compartment than in the second zone, to move into that open space in the first compartment, and thereby move away from, dislodge, and release any material held up in the second compartment on the other side of the movable wall separator, thus breaking up or preventing bridges, and enhancing the free flowing discharge of particulate material stored in the container.

2. A particulate material storage container in accordance with claim 1, in which the separator is a flexible sheet capable of swinging or lateral movement in any portion, so that when one portion thereof is incapable of movement, another portion thereof is free to move, in response to an imbalance of material stored in adjacent compartments.

3. A particulate material storage container in accordance with claim 1, in which the separator is inflatable.

4. A particulate material storage container in accordance with claim 1, in which the separator is supported within the container by an overhead suspension system which permits free swinging movement of the separator.

5. A particulate material storage container in accordance with claim 4, in which the suspension system comprises at least one rigid horizontal support bar disposed at the upper portion of the material container, a plurality of clamps secured to the support bar, a corresponding number of gripping holders secured to the upper portion of each separator, and a plurality of chains, each connected to a clamp and its corresponding gripping holder.

6. A particulate material storage container in accordance with claim 1, in which the separators are nylon sheets having a coating of neoprene.

7. A particulate material storage container in accordance with claim 1, in which the container is a railway freight car.

8. A particulate material storage container in accordance with claim 1, comprising a cylindrical container, three movable separators vertically suspended within the container about its axial centerline, approximately 120° apart, to divide the container into three vertical compartments, said separators being movable laterally in response to an imbalance of material stored in adjacent compartments.

9. A particulate material storage container in accordance with claim 8, in which each separator extends radially from the center of the container to a position adjacent the wall thereof.

10. A particulate material storage container in accordance with claim 8, in which the separators are supported within by an overhead suspension system disposed at an upper portion of the container, said suspension system comprising three horizontal arms radially disposed 120° apart, a plurality of clamps attached to the arms, a corresponding number of gripping holders secured to the upper portion of each separator and a plurality of chains to connect each clamp to its corresponding gripping holder.

11. A particulate material storage container in accordance with claim 9, in which the separators are flexible sheets.

12. A particulate material storage container in accordance with claim 9, in which the separators are inflatable.

13. A particulate material storage container in accordance with claim 1, in which the separator is flexible, and extends to a position adjacent the sidewalls of the container, effectively dividing the container into separate well-defined compartments.

12-068 CIP

PO-1050
(5/69)

UNITED STATES PATENT OFFICE
CERTIFICATE OF CORRECTION

Patent No. 3,587,936          Dated June 28, 1971

Inventor(s) DOMINIC J. RIOTTO

It is certified that error appears in the above-identified patent and that said Letters Patent are hereby corrected as shown below:

Column 1, line 2, after "and" add -- now --

Column 5, line 61: "zone" should be -- compartment --

Signed and sealed this 29th day of February 1972.

(SEAL)
Attest:

EDWARD M. FLETCHER, JR.
Attesting Officer

ROBERT GOTTSCHALK
Commissioner of Patents